(12) United States Patent
Lo

(10) Patent No.: US 9,091,353 B2
(45) Date of Patent: Jul. 28, 2015

(54) GAS CHARGING CHECK VALVE AND PRECISION CONTAINER APPARATUS WITH GAS CHARGING CHECK VALVE

(71) Applicant: GUDENG PRECISION INDUSTRIAL CO, Ltd, Tucheng, Taipei County (TW)

(72) Inventor: Hsaio-Chia Lo, Tucheng (TW)

(73) Assignee: Gudeng Precision Industrial Co, Ltd., New Taipei (TW)

( * ) Notice: Subject to any disclaimer, the term of this patent is extended or adjusted under 35 U.S.C. 154(b) by 329 days.

(21) Appl. No.: 13/711,833

(22) Filed: Dec. 12, 2012

(65) Prior Publication Data

US 2014/0083532 A1    Mar. 27, 2014

(30) Foreign Application Priority Data

Sep. 26, 2012  (TW) .............................. 101218655 U

(51) Int. Cl.
*F16K 15/00* (2006.01)
*F16K 1/30* (2006.01)
*F16K 15/02* (2006.01)
*F16K 17/04* (2006.01)
*F16K 27/02* (2006.01)

(52) U.S. Cl.
CPC ................ *F16K 1/30* (2013.01); *F16K 15/026* (2013.01); *F16K 17/044* (2013.01); *F16K 27/0209* (2013.01)

(58) Field of Classification Search
CPC ..... F16K 1/30; F16K 15/026; F16K 27/0209; F16K 17/044
USPC ............. 137/508, 512, 512.2, 513, 522, 528, 137/529, 542, 493.6, 515, 515.7, 614.05, 137/614.06; 206/710, 711, 832, 833
See application file for complete search history.

(56) References Cited

U.S. PATENT DOCUMENTS

| | | | | |
|---|---|---|---|---|
| 3,338,259 | A * | 8/1967 | Tribe | 137/220 |
| 5,971,203 | A * | 10/1999 | Bae | 220/746 |
| 6,199,604 | B1 * | 3/2001 | Miyajima | 141/98 |
| 7,455,180 | B2 * | 11/2008 | Sumi et al. | 206/710 |
| 7,658,290 | B2 * | 2/2010 | Sumi et al. | 206/710 |
| 7,694,498 | B2 * | 4/2010 | Pan et al. | 53/510 |
| 8,091,592 | B2 * | 1/2012 | Sato | 141/63 |
| 8,403,143 | B2 * | 3/2013 | Chiu et al. | 206/454 |
| 2010/0078894 | A1 * | 4/2010 | Lu | 277/312 |
| 2010/0163452 | A1 * | 7/2010 | Lin et al. | 206/711 |

* cited by examiner

*Primary Examiner* — Jessica Cahill
(74) *Attorney, Agent, or Firm* — Alan D. Kamrath; Kamrath IP Lawfirm, P.A.

(57) ABSTRACT

A gas charging check valve uses a first elastic element and a second elastic element, which respectively provide elastic force on a top valve and a bottom valve. The top valve and the bottom valve correspond to each other as a set. When the gas charging device is moved to apply an external force on a movement control portion of the gas charging check valve, the second elastic element removes the elastic force applied on the bottom valve to reduce the required gas inject force for a valve formed by the top valve and the bottom valve, so that the gas can more easily enter the valve.

5 Claims, 7 Drawing Sheets

GAS CHARGING CHECK VALVE AND PRECISION CONTAINER APPARATUS WITH GAS CHARGING CHECK VALVE

FIELD OF THE INVENTION

The present invention is related to a gas charging check valve and a precision component container apparatus with a gas charging check valve.

BACKGROUND

Today, the process of manufacturing semiconductor precision components is divided into several processing chambers. Precision component container apparatuses are used for moving precision components among each processing chamber.

To ensure that precision components are isolated from pollution and contact with ambient air, one conventional approach is to charge precision component container apparatuses with gas.

Thus, a precision component container apparatus today usually has a check valve to prevent leakage of gas from the precision component container apparatus. Usually, a spring and a valve are used in a check valve. Specifically, the elastic force of a spring is applied to a valve. When gas is injected into the container, the entrance force of the gas exceeds the elastic force of the spring, forcing the valve to open for charging of the precision component container apparatus with a gas such as nitrogen.

Usually, a gas charging device does not need to produce a large pushing force while supplying gas into a precision component container apparatus. The pushing force only needs to be larger than the elastic force of a spring in a check valve. Thus, the elastic force of a check valve cannot be so large that it cannot be exceeded by the pushing force of the gas. Otherwise, if the pushing force of the gas cannot completely open the valve, an insufficient amount of gas will be injected into the container, and the purpose of cleaning precision components will not be achieved.

However, if the elastic force of a check valve spring is reduced, any shaking or vibrating during the charging operation may cause the check valve spring to move easily, such that the valve will open abnormally and the gas will leak from the precision component container apparatus.

Thus, it is necessary to design a gas charging check valve with better gas tightness and a precision component container apparatus with said gas charging check valve.

SUMMARY OF THE INVENTION

An objective of the present invention is to provide a gas charging check valve and a precision component container apparatus with better gas tightness.

The precision component container apparatus of one embodiment of the present invention includes a container body having an opening, a door body, and at least one gas charging check valve. The door body corresponds to the opening for sealing the precision component container apparatus. A through hole is disposed on the container body or on the door body. The gas charging check valve is embedded in the through hole to control passage of the gas in and out (gas in and gas out).

The gas charging check valve includes a top cover portion and a bottom cover portion. The top cover portion includes a top cover fixing portion, a first elastic element, a top valve and a cover body. The first elastic element is disposed between the top cover and the body. The first elastic element exerts elastic force on the top valve. The bottom cover portion includes a bottom cover fixing portion, a second elastic element, a movement control portion and a bottom valve. The movement control portion is disposed between the second elastic element and the bottom valve. The second elastic element exerts elastic force on the bottom valve. There is a protrusion portion on the movement control portion.

The top cover fixing portion and the bottom cover fixing portion are joined correspondingly. The cover body is embedded on the top cover fixing portion, such that the first elastic element, the top valve, the second elastic element, the movement control portion and the bottom valve are disposed in the top cover fixing portion and the bottom cover fixing portion. The protrusion portion of the movement control portion protrudes outside the bottom cover fixing portion. When the protrusion portion of the movement control portion is moved by an external force, the elastic force on the bottom valve from the second elastic element is removed.

The top valve extends downwardly with a first cylinder, and the bottom valve extends upwardly with a second cylinder. The first cylinder and the second cylinder correspond to each other and join together to form a valve for controlling gas in and gas out.

In one embodiment, the top valve and the bottom valve are formed as a unibody design.

The second elastic element is a spring, and the movement control portion further includes a groove corresponding to the spring, such that a portion of the spring is embedded in the groove.

In addition, the second elastic element may be an elastic reed. The elastic reed and the movement control portion are integrated as a unibody.

DETAILED DESCRIPTION OF EMBODIMENT(S)

Figure 1:
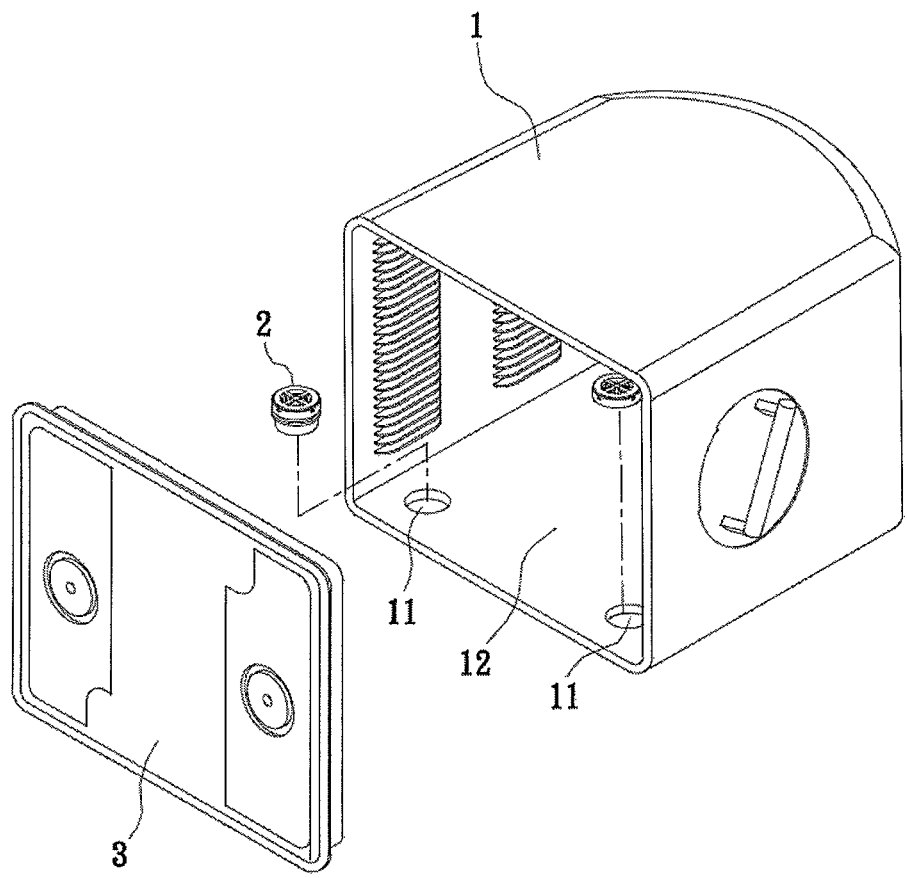
FIG. 1 is an exploded view of a precision component container apparatus according to the present invention.

To more clearly explain technical details of the inventions, several embodiments are disclosed as follows. Please be noted that the directional terms of "up", "down", "left", and "right" are used only for indicating relative positions and are not intended to limit the scope of the invention. In addition, the numbers of illustrated components in the drawings are used as examples and are not intended to limit the scope of the invention.

Figure 2:
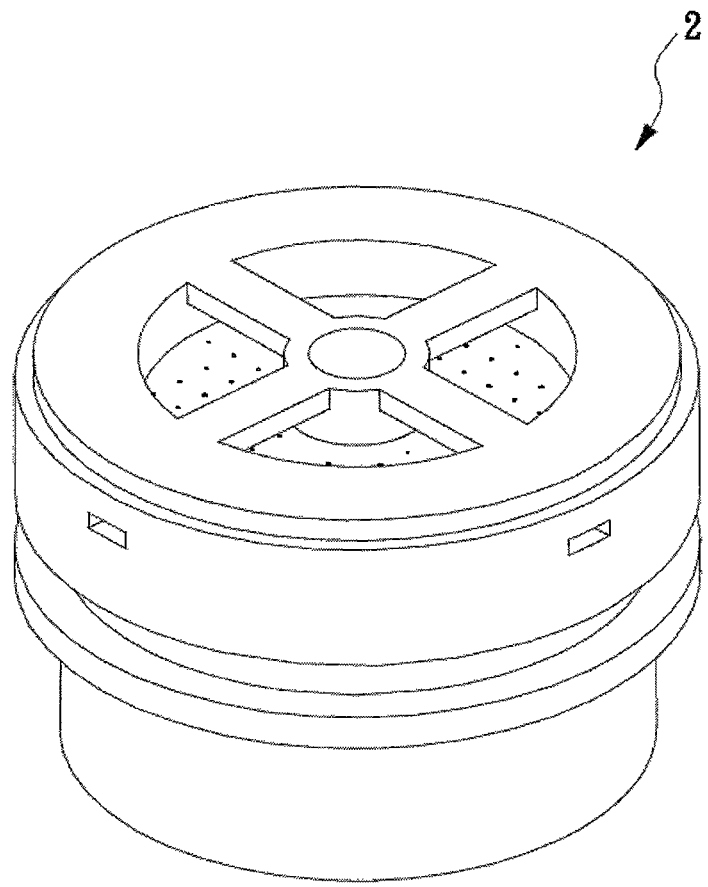
FIG. 2 is a perspective view of a gas charging check valve according to the present invention.

Please refer to FIG. 1 and FIG. 2, which illustrate a precision component container apparatus including a container body 1, a door body 3 and at least one gas charging check valve 2. The container body 1 has an opening 12. The door body 3 corresponds to the opening 12. The door body 3 may firmly seal the opening 12 of the precision component container apparatus. As illustrated in FIG. 1, the container body 1 has a through hole 11. The gas charging check valve 2 is embedded in the through hole 11 for controlling gas in and out, and more details are explained as follows. Please note that the through hole 11 for embedding the gas charging check valve 2 may also be set in the door body 3 (not shown). The position and number of the through hole 11 correspond to a gas charging device 50 (shown in FIG. 5) on a load port.

Figure 3:
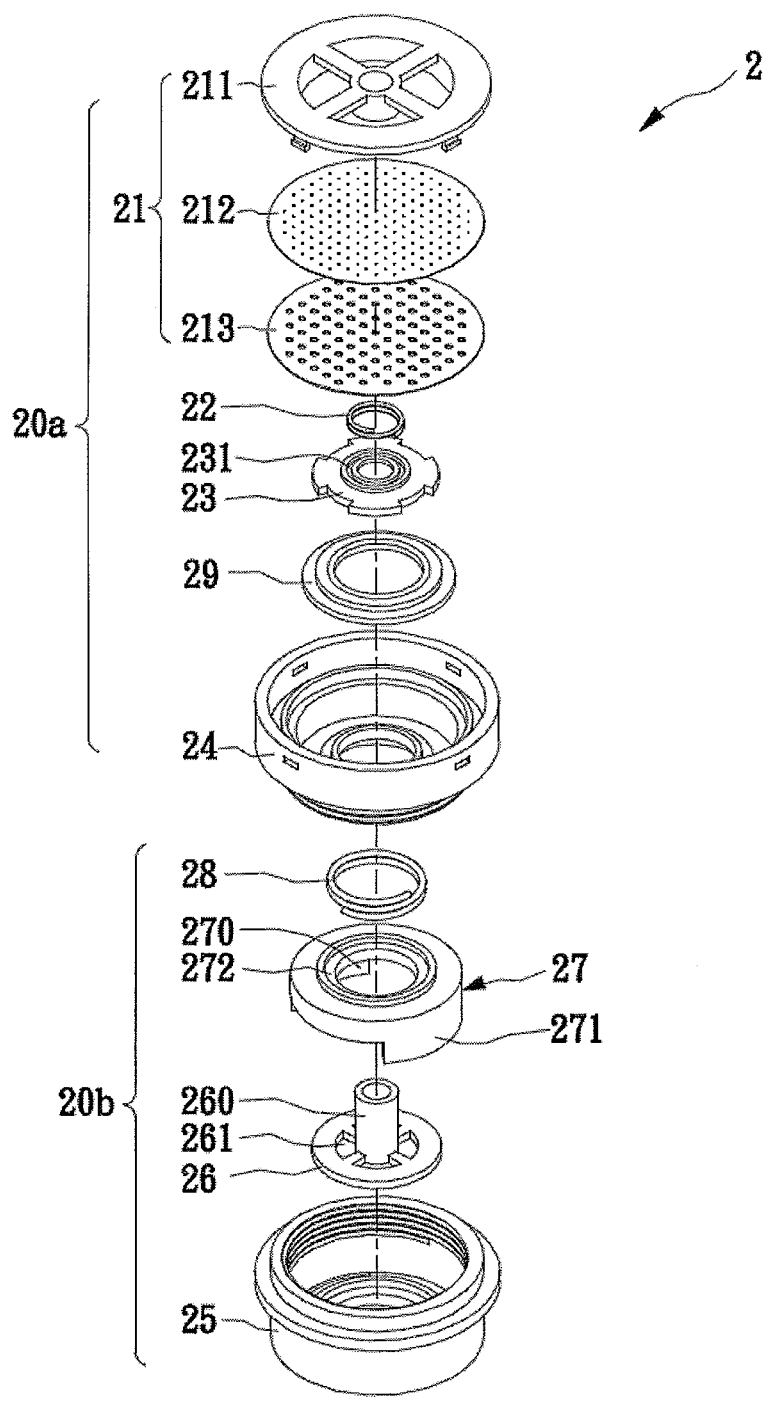
FIG. 3 is an exploded view diagram of a gas charging check valve according to the present invention.
Figure 4:
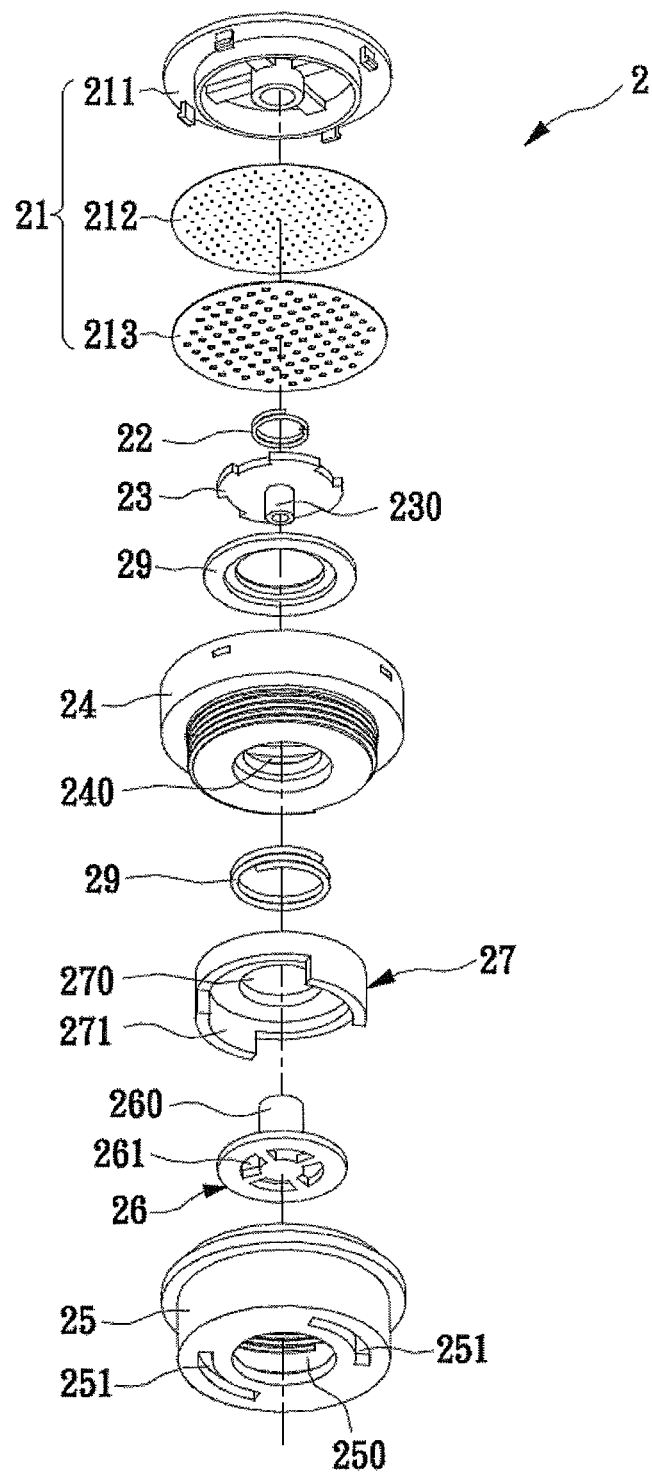
FIG. 4 is an exploded view diagram of FIG. 3 from another angle.

Please also refer to FIG. 3 and FIG. 4. The gas charging check valve 2 includes a top cover portion 20a and a bottom cover portion 20b. The top cover portion 20a includes a top cover fixing portion 24, a first elastic element 22, a top valve 23 and a top cover body 21. The first elastic element 22 is disposed between the top valve 23 and the cover body 21. The first elastic element 22 exerts elastic force on the top valve 23. In this embodiment, the first elastic element 22 is a spring. A portion of the first elastic element 22 is embedded in a fixing groove 231 of the top valve for fixing the first elastic element 22.

The cover body 21 includes a main cover body 211, a filter net 212 and a separating net 213. As the filter net 212 and the separating net 213 are similar to the conventional filter net and separating net, explanations are omitted for brevity. To increase gas tightness, a gasket 29 is further disposed between the top valve 23 and the top cover fixing portion 24. By clipping the main cover body 211 to cover the top cover fixing portion 24, the filter net 212, the separating net 213, the first elastic element 22, the top valve 23, the gasket 29 and other components are fixed between the main cover body 211 and the top cover fixing portion 24.

The bottom cover portion 20b includes a bottom cover fixing portion 25, a second elastic element 28, a movement control portion 27 and a bottom valve 26. The movement control portion 27 is disposed between the second elastic element 28 and the bottom valve 26. The second elastic element 28 exerts elastic force on the movement control portion 27 and also exerts elastic force on the bottom valve 26 with the movement control portion 27 at the same time. Preferably, the second elastic element 28 is a spring, and the movement control portion 27 further includes a groove 272. The groove 272 corresponds to the second elastic element 28, such that a portion of the spring is embedded in the groove 272 for fixing the second elastic element 28. In addition, in alternative embodiments, the second elastic element 28 may be an elastic reed. The elastic reed and the movement control portion 27 are integrated as a one piece unibody (not shown). For example, several plastic clips (not shown) are designed extending upwardly around the upper side of the movement control portion 27.

Preferably, the top valve 23 extends downwardly with a first cylinder 230, and the bottom valve 26 extends upwardly with a second cylinder 260. The first cylinder 230 is socketed into the second cylinder 260, such that they correspond to each other (further explanation provided below). Although the top valve 23 and the bottom valve 26 are illustrated as two separate components, under proper injection molding technology, the top valve 23 and the bottom valve 26 may also be designed as a one piece unibody.

The top cover fixing portion 24 and the bottom cover fixing portion 25 correspond to each other. The cover body 21 is embedded on the top cover fixing portion 24, such that the first elastic element 22, the top valve 23, the second elastic element 28, the movement control portion 27 and the bottom valve 26 are fixed in the top cover fixing portion 24 and the bottom cover fixing portion 25.

Figure 5:
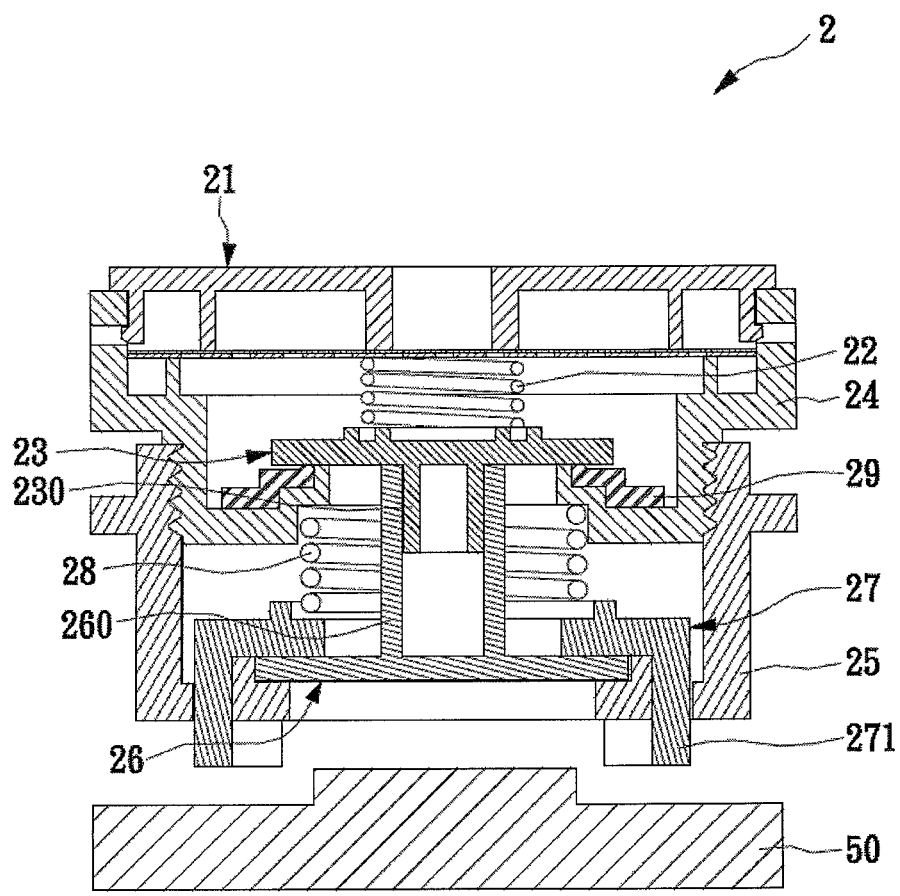
FIG. 5 is a sectional diagram of FIG. 2.

Please refer to FIG. 5, which illustrates control of gas in and gas out with the gas charging check valve of the present invention. When the gas charging device 50 does not contact the gas charging check valve 2 of the present invention, and due to the elastic force provided by the first elastic element 22 and the second elastic element 28 (downward elastic force), the valve formed by the top valve 23 and the bottom valve 26 contact the edges of the top cover fixing portion 24 and the bottom cover fixing portion 25 respectively. Because the top valve 23 does not have a gas hole, gas in the precision component container apparatus (shown in FIG. 1) does not leak downwardly. Due to the elastic force provided by the second elastic element 28, a protrusion portion 271 of the movement control portion 27 extends downwardly and through the through hole 251 of the bottom cover fixing portion 25 and protrudes outside the bottom cover fixing portion 25.

Figure 6:
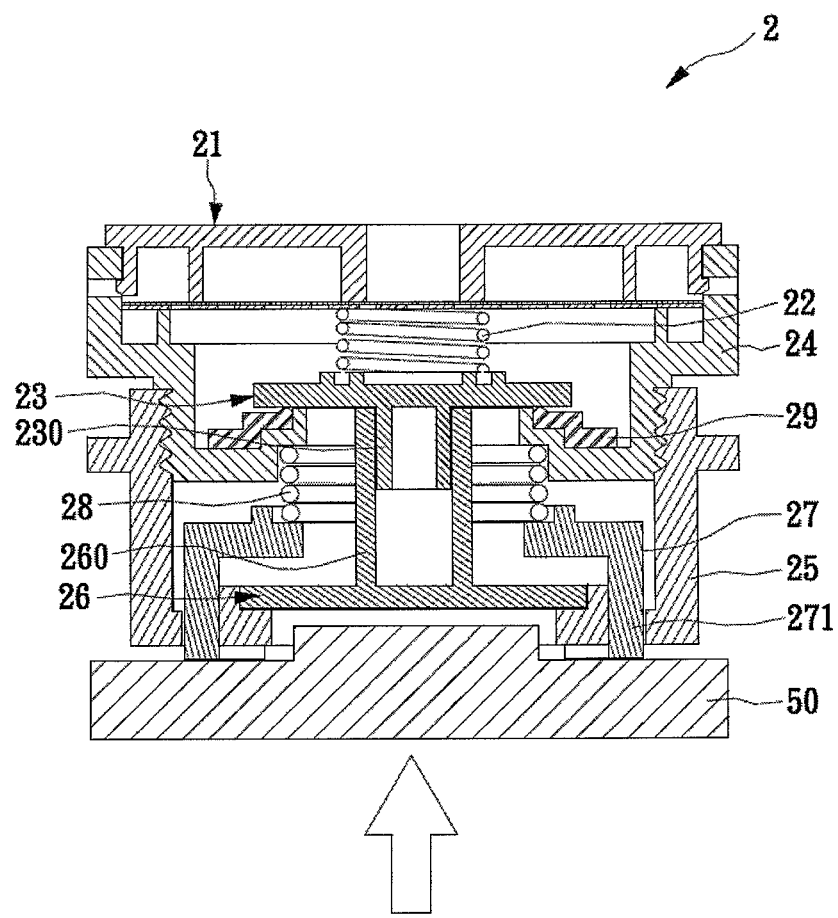
FIG. 6 is a sectional view diagram illustrating operation of a gas charging device applied on a gas charging check valve.

Please refer to FIG. 6. When the precision component container apparatus is to be charged with gas, the gas charging device 50 moves along the direction of the arrow, the protrusion portion 271 of the movement control portion 27 is moved by the pushing force of the gas charging device 50, and the elastic force from the second elastic element 28 on the bottom valve 26 is removed.

Figure 7:
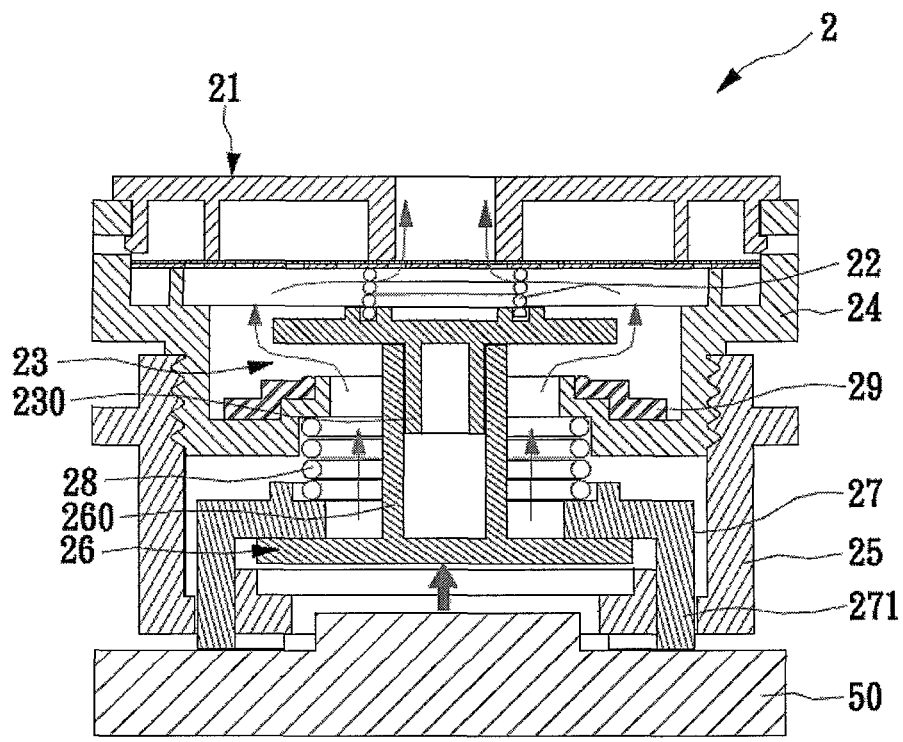
FIG. 7 illustrates gas flowing in FIG. 6 with directional arrows.

Please refer to FIG. 7. When the gas charging device 50 starts charging the container with gas, its gas entrance force only needs to exceed the elastic force of the first elastic element 22 for gas to flow (as illustrated by the arrow direction) from the gas entrance 250 of the bottom cover fixing portion 25, via the gas entrance 261 of the bottom valve 26, the gas entrance 270 of the movement control portion 27, the gas entrance 240 of the top cover fixing portion 24 and the cover body 21. Then, the gas enters into the precision component container apparatus. Please refer to the reference numerals in FIG. 4 for the gas entrances.

Because of the movement control portion and the second elastic element, an additional elastic pressure force is applied on the valve that was originally controlled only by the first elastic element with its elastic force, and gas leakage is prevented even if shaking occurs while the precision component container apparatus is being moved. In addition, the movement control portion is used to control the second elastic element, so the gas entrance force of a gas charging device does not need to be too large, thus preventing the problem of incomplete gas charging.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A gas charging check valve comprising:
a top cover portion comprising a top cover fixing portion, a first elastic element, a top valve and a cover body, wherein the first elastic element is disposed between the top valve and the cover body, and wherein elastic force is applied on the top valve by the first elastic element; and
a bottom cover portion comprising a bottom cover fixing portion, a second elastic element, a movement control portion and a bottom valve, wherein the movement control portion has a protrusion portion, wherein the movement control portion is disposed between the second elastic element and the bottom valve, wherein the second elastic element applies elastic force on the movement control portion, and wherein the elastic force of the second elastic element is applied on the bottom valve with the movement control portion;

wherein the top cover fixing portion and the bottom cover fixing portion are joined correspondingly, wherein the cover body is embedded on the top cover fixing portion with the first elastic element, the top valve, the second elastic element, the movement control portion and the bottom valve disposed inside the top cover fixing portion and the bottom cover fixing portion, wherein the protrusion portion protrudes outside the bottom cover fixing portion, and wherein when the protrusion portion of the movement control portion is moved by an external force, the elastic force exerted on the bottom valve by the second elastic element is removed.

2. The gas charging check valve claimed in claim 1, wherein the top valve extends downwardly with a first cylinder, wherein the bottom valve extends upwardly with a second cylinder, and wherein the first cylinder and the second cylinder correspond to each other to form a valve for controlling gas in and out.

3. The gas charging check valve claimed in claim 1, wherein the second elastic element is a spring, and wherein the movement control portion further comprises a groove corresponding to the spring with a portion of the spring embedded in the groove.

4. A precision component container apparatus having a gas charging check valve, wherein the precision component container apparatus comprises:
    a container body having an opening; and
    a door body corresponding to the opening for sealing the opening; wherein a through hole is disposed in the door body or the container body, and wherein the gas charging check valve is embedded in the through hole for controlling gas in and out; wherein the gas charging check valve comprises:
    a top cover portion comprising a top cover fixing portion, a first elastic element, a top valve and a cover body, wherein the first elastic element is disposed between the top valve and the cover body, and wherein elastic force is applied on the top valve by the first elastic element; and
    a bottom cover portion comprising a bottom cover fixing portion, a second elastic element, a movement control portion and a bottom valve, wherein the movement control portion has a protrusion portion, wherein the movement control portion is disposed between the second elastic element and the bottom valve, wherein the second elastic element applies elastic force on the movement control portion, and wherein the elastic force of the second elastic element is applied on the bottom valve with the movement control portion;
    wherein the top cover fixing portion and the bottom cover fixing portion are joined correspondingly, wherein the cover body is embedded on the top cover fixing portion with the first elastic element, the top valve, the second elastic element, the movement control portion and the bottom valve disposed inside the top cover fixing portion and the bottom cover fixing portion, wherein the protrusion portion protrudes outside the bottom cover fixing portion, and wherein when the protrusion portion of the movement control portion is moved by an external force, the elastic force exerted on the bottom valve by the second elastic element is removed.

5. The precision component container apparatus claimed in claim 4, wherein the top valve extends downwardly with a first cylinder, wherein the bottom valve extends upwardly with a second cylinder, and wherein the first cylinder and the second cylinder correspond to each other to form a valve for controlling gas in and out.

* * * * *